Patented Feb. 2, 1954

2,668,151

UNITED STATES PATENT OFFICE 2,668,151

HYDROPHOBIC INORGANIC PARTICULATE MATERIALS

George Wesley Pedlow, Jr., Easton, Pa., and Carl Shelley Miner, Jr., Winnetka, Ill., assignors to Minnesota Mining & Manufacturing Company, St. Paul, Minn., a corporation of Delaware No Drawing. Application June 12, 1948, Serial No. 32,726

2 Claims. (Cl. 252—428)

This application is a continuation-in-part of our copending application Serial No. 470,904, filed December 31, 1942, now Patent 2,566,956.

This invention relates in general to hydrophobic particulate material, and specifically to normally hydrophilic porous particles of the nature of diatomaceous earth which have been rendered hydrophobic by treatment with certain organic compounds of silicon, of which the tertiaryalkoxy halosilanes are preferred examples.

Compounds of the nature of di-tertiary-amoxy dichlorosilane, containing hydrolyzable chlorine radicals and relatively non-hydrolyzable tertiary-alkoxy groups attached to silicon, may be prepared by the reaction of silicon tetrachloride with tertiary alcohols in the presence of pyridine or other acid acceptor.

We have found that diatomaceous earth and analogous porous particulate hydrophilic siliceous powders, when treated with compounds such as di-tertiary-amoxy dichlorosilane, are rendered highly water-resistant and hydrophobic. These treated powders are found to be useful for a variety of purposes for which the untreated powder is less effective. The treated powder is particularly effective where resistance to wetting by water is desirable, and is also effective for many purposes because of the organophilic nature of the treated surface. Thus, the treated powder has important utility as a filter aid, and in oil-base polishes, paints, coatings, and the like.

One procedure which has been employed in the treatment of diatomaceous earth according to this invention is inherent in the preparation of the di-tertiary-alkoxy dichlorosilane by the specific procedure hereinafter to be described.

*Process for the manufacture of di-tert-amoxy dichloro silicane*

Materials to be employed and proportions:

| Material | Weights | Moles |
| --- | --- | --- |
| | Parts | |
| Silicon tetrachloride | 510 | 3.00 |
| Pyridine | 498 | 6.33 |
| Tertiary-amyl alcohol | 528 | 6.00 |
| Benzene (as solvent) | 1,050 | |
| Benzene (for washing $C_5H_5N.HCl$) | 1,100 | |

The benzene and silicon tetrachloride are placed in the reaction vessel, preferably glass lined, and cooled to about 10° C. by means of brine or other heat exchange medium. While stirring the solution, the pyridine is slowly added, the temperature being kept below 20° C. during the addition. The addition of the pyridine requires a substantial period of time, e. g. from 1 to 2 hours, depending on the efficiency of the cooling system. Throughout the entire addition the pyridine and silicon tetrachloride react to form a white precipitate which toward the end forms a fairly thick paste with the benzene. The formation of this white precipitate on the walls of the reaction vessel as a result of the interaction of the vapors of the reactants can be reduced to a minimum by having the pyridine inlet extend to within a few inches of the surface of the benzene. After addition of the pyridine is complete the mixture is stirred, e. g. an additional 15 minutes, more or less.

The tert-amyl alcohol is then added, all at once. The temperature rises slowly at first, but once above about 30° C. it rises rather quickly. Unless the dimensions of the reaction vessel are sufficiently restricted, it is desirable to employ internal cooling coils or elements, so that loss of material due to overheating will be avoided. It has been found convenient to allow the temperature to rise to about 40–45° C. then, by controlled cooling, it is kept at this temperature until the reaction subsides. This requires about 1.5 to 2 hours more or less. The mixture is then heated slowly over a period of about 45 minutes to reflux temperature. The slow heating tends to form a granular pyridine hydrochloride which lends itself well to subsequent filtration. Refluxing is then continued for about two hours, to insure completion of the reaction. It is then cooled and filtered to remove the pyridine hydrochloride, recovering both the filtrate and filter cake. What is ordinarily a very slow filtration can be accomplished quickly by forming a bed of filter-aid such as "Filter Cel" or "Super Cel" on the filtering medium, such as cloth. This can be done by suspending 15-20 parts of the filter-aid in 200-300 parts of benzene and filtering this suspension through the filtering apparatus. The benzene can be used later for washing purposes. The pyridine hydrochloride is substantially freed of filtrate and then washed with benzene until substantially free of the ditertiary-amoxy dichloro silicane product.

The filtrate and washings are combined and the benzene is distilled off at atmospheric pressure. When there is no further benzene distillate the product is cooled and the distillation continued at reduced pressure, e. g. an absolute pressure of 10 to 100 mm., to separate the ditertiary-amoxy dichloro silicane product from remaining materials (i. e. products of side reactions, impurities, etc.). The product decomposes when distilled at atmospheric pressure.

A glass lined still, suitable for vacuum distillation, may be employed for both the distillation at atmospheric pressure and the subsequent distillation at reduced pressures.

After a small amount of low boiling material (mostly benzene) is removed in the vacuum distillation, the major portion of the product boils at 105° C. at 22 mm. absolute pressure. The distillate is sometimes cloudy with pyridine hydrochloride, but this settles out on standing and has proved to be of no consequence when the product is used in other reactions. About 700 parts by weight (85% of theoretical yield) of di-tert-amoxy dichloro silicane is obtained.

In the preparation of di-tertiary-butoxy dichloro silicane the process is substantially identical with that above described except that 444 parts by weight (6.0 mols) of tertiary-butyl alcohol are used in place of 528 parts of tertiary-amyl alcohol above indicated. The boiling point of the di-tertiary-butoxy dichloro silicane is 66° C. at 11 mm. absolute pressure Similarly, dichloro-tert-butyl alcohol, 1-ethylcyclohexanol, dihydroterpineol, terpineol and linalool react with silicon tetrachloride in the presence of pyridine, yielding respectively: bis (dichloro-tert-butoxy) dichloro silicane, B. P. 173–6° C. at 10 mm.; bis (1-ethylcyclohexoxy) dichloro silicane, B. P. 170–3° C. at 5 mm.; bis (dihydroterpineoxy) dichloro silicane, B. P. 195° C. at 7 mm., and diterpineoxy and dilinalooxy dichloro silicanes which latter two compounds could not be distilled without decomposition at 5 mm. pressure. The average yield was about 75–80% of the theoretical in all cases.

During the above-described procedure, the filter-aid, a diatomaceous earth, is effectively treated and rendered hydrophobic by contact with the solution of the silane compound during the filtering operation. The pyridine hydrochloride commonly is mainly removed as a separate layer from the bed of treated filter-aid on the filter-cloth. The remainder of this soluble by-product may be removed by washing with water. The filter-aid, recovered in the form of a dry powder after such washing, is found to be unwetted by water and to retain this hydrophobic property even on prolonged exposure to contact with water.

In possible explanation of this phenomenon, it is suggested that the di-tertiary-alkoxy dichlorosilane reacts with adsorbed water or with hydroxyl groups present at the interior and exterior surface areas of the porous diatomaceous earth particles, resulting in the replacement of the chlorine by a silicon-oxygen linkage. The silicon atom of the silane is thus firmly bonded to the surface of the diatomaceous earth, and holds the tertiary-alkoxy radicals thereto. The presence of these hydrolysis-resistant radicals, each containing a tertiary carbon atom bonded to silicon through an intervening oxygen atom, at the surface layer is responsible for the advantageous properties found in the treated product.

Di-tertiary-butoxy dichlorosilane and di-tertiary-amoxy dichlorosilane, appear to be most desirable for the treatment of particulate materials such as diatomaceous earth, but many other similar or analogous organic silicon compounds may be substituted for these specific compounds to produce useful hydrophobic particulate products. Among such compounds may be included the various other compounds already mentioned, as well as the following:

Tri-tertiary-butoxy chlorosilane
Tertiary-butoxy trichlorosilane
Sym-tetra-tertiary-butoxy-dichlorodisiloxane
Di-tertiary-butoxy tetrachlorodisiloxane
Penta-tertiary-butoxy chlorodisiloxane
Bis (4-acetoxy-2-methyl-2-pentoxy) dichlorosilane Analogous compounds in which the chlorine is replaced by bromine may also be substituted.

These and other compounds applicable to our invention each contain at least one tertiary carbinoxy radical bonded to silicon. By "tertiary carbinoxy" is meant a radical which may be designated as

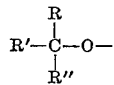

where R is a monovalent carbinyl radical, R' is any monovalent carbinyl radical and R" is any monovalent carbinyl radical. Thus the groups attached to the carbinol carbon may be aliphatic or aromatic; if aliphatic, they may be saturated or unsaturated, and if cyclic, they can contain a hetero atom such as oxygen in the furan ring or sulfur in the thiophene ring. They can be substituted by additional groups which are unreactive toward silicon tetrachloride such as halogen, nitro, alkoxy, or acetoxy. If aromatic, they can also be substituted with additional groups unreactive toward silicon tetrachloride such as alkyl or any of the groups described above.

The specific types of diatomaceous earth or infusorial earth mentioned under the example, namely, "Filter-Cel" and "Super-Cel," are specially purified products particularly designed for use as filter-aids. When treated as herein specified, they attain novel properties and improved utility, as noted. Other grades of naturally occurring diatomaceous earth or the like, as well as various forms of synthetic inorganic or siliceous powders, which in their normal state are hydrophilic, may be rendered hydrophobic in accordance with the principles of our invention.

We claim:

1. Hydrophobic siliceous powder material comprising a normally hydrophilic siliceous powder rendered hydrophobic by treatment with a tertiary carbinoxy chlorosilane, the chlorine being hydrolyzed out of the molecule of said tertiary-carbinoxy chlorosilane during said treatment, leaving a hydrophobic treatment including tertiary-carbinoxy groups and silicon on said powder.

2. Hydrophobic diatomaceous earth comprising a normally hydrophilic diatomaceous earth rendered hydrophobic by treatment with a tertiary-alkoxy chlorosilane, the chlorine being hydrolyzed out of the molecule of said tertiary-alkoxy chlorosilane during said treatment, leaving a hydrophobic treatment including tertiary-alkoxy groups and silicon on the particles of said diatomaceous earth.

GEORGE WESLEY PEDLOW, Jr.
CARL SHELLEY MINER, Jr.

References Cited in the file of this patent

UNITED STATES PATENTS

| Number | Name | Date |
|---|---|---|
| 2,194,683 | Badollet | Mar. 26, 1940 |
| 2,306,222 | Patnode | Dec. 22, 1942 |

OTHER REFERENCES

Backer, "Rec. Trav. Chim.," vol. 61, pages 500–512 (Pub. #6 of June 1942).